US011029516B2

(12) United States Patent
Kondo et al.

(10) Patent No.: US 11,029,516 B2
(45) Date of Patent: Jun. 8, 2021

(54) IMAGE DISPLAY APPARATUS

(71) Applicant: CANON KABUSHIKI KAISHA, Tokyo (JP)

(72) Inventors: Ryoji Kondo, Yokohama (JP); Masakazu Tohara, Komae (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 351 days.

(21) Appl. No.: 16/111,448

(22) Filed: Aug. 24, 2018

(65) Prior Publication Data
US 2019/0064512 A1 Feb. 28, 2019

(30) Foreign Application Priority Data
Aug. 31, 2017 (JP) .............................. JP2017-166284

(51) Int. Cl.
*G02B 27/00* (2006.01)
*G06T 5/00* (2006.01)
*G02B 5/04* (2006.01)
*G02B 27/01* (2006.01)

(52) U.S. Cl.
CPC ............ *G02B 27/0081* (2013.01); *G02B 5/04* (2013.01); *G02B 27/0172* (2013.01); *G06T 5/006* (2013.01)

(58) Field of Classification Search
None
See application file for complete search history.

(56) References Cited

U.S. PATENT DOCUMENTS

| 5,959,780 A * | 9/1999 | Togino ............... G02B 27/0172 359/630 |
| 2001/0009478 A1* | 7/2001 | Yamazaki ............ G02B 27/017 359/630 |
| 2010/0109977 A1* | 5/2010 | Yamazaki .......... G02B 27/0172 345/8 |
| 2013/0027784 A1* | 1/2013 | Takahashi ............. G02B 13/10 359/669 |
| 2015/0219898 A1* | 8/2015 | Ko ..................... G02B 27/0172 359/631 |
| 2017/0184852 A1* | 6/2017 | Tanaka ............... G02B 27/0172 |
| 2018/0024369 A1* | 1/2018 | Kato .................. G02B 27/0176 359/13 |
| 2018/0045964 A1* | 2/2018 | Jones ....................... G06F 1/163 |
| 2018/0198977 A1* | 7/2018 | Okumura ........... H04N 5/23229 |
| 2018/0220117 A1* | 8/2018 | Hada ...................... H04N 9/735 |

(Continued)

FOREIGN PATENT DOCUMENTS

JP 3406958 B2 5/2003
JP 3683337 B2 8/2005

*Primary Examiner* — Martin Mushambo
(74) *Attorney, Agent, or Firm* — Rossi, Kimms & McDowell LLP

(57) ABSTRACT

An image display apparatus includes an observation optical system that includes a prism having first to third surfaces. The observation optical system has a first section is a section that contains an optical path of light from a center of the original image to a center of the exit pupil through the third surface, the first surface, the second surface, and the first surface, and a second section is a section orthogonal to the first section. A reflection area for an internal reflection of the light on the first surface has a center part that is concave toward the exit pupil on the second section and a peripheral part at both sides of the center part has a convex shape toward the exit pupil.

8 Claims, 7 Drawing Sheets

(56) References Cited

U.S. PATENT DOCUMENTS

2018/0292656 A1\* 10/2018 Geng .................... H04N 13/332
2018/0373038 A1\* 12/2018 Ishii ......................... G02B 3/04
2020/0103654 A1\* 4/2020 Cheng .................... G03B 21/00

\* cited by examiner

IMAGE DISPLAY APPARATUS

BACKGROUND OF THE INVENTION

Field of the Invention

The present invention relates to an image display apparatus, such as a head mount display (HMD), used to observe an (original) image displayed on a display device (or element) via an observation optical system.

Description of the Related Art

The image display apparatus is demanded for a small structure and a wide angle of view. Each of Japanese Patents Nos. 3,406,958 and 3,683,337 discloses an image display apparatus using a decentering (or eccentric) optical system (prism) using a plurality of decentering reflection surfaces each having a power. This decentering optical system includes a reflection and transmission surface that internally totally reflects the light and then transmits the light to an eye (exit pupil) of an observer.

However, as the angle of view is the decentering optical system disclosed in each of Japanese Patents Nos. 3,406,958 and 3,683,337 is made wider, the transmission and reflection surface protrudes to the eye side of the observer and an eye relief becomes shorter that is a distance between the optical system and the eye of the observer.

SUMMARY OF THE INVENTION

The present invention provides an image display apparatus having a sufficient eye relief with a wide angle of view using a decentering optical system that includes a reflection and transmission surface.

An image display apparatus according to one aspect of the present invention includes a display device, and an observation optical system that includes a prism having at least a first surface, a second surface, and a third surface as optical surfaces and an internal space in the prism is filled with an optical medium, the observation optical system being configured to enable light from an original image displayed on the display device to transmit the third surface, to reflect the light on the first surface, to reflect the light on the second surface, to transmit the light through the first surface, and to lead the light to an exit pupil. The observation optical system has a first section is a section that contains an optical path of light from a center of the original image to a center of the exit pupil through the third surface, the first surface, the second surface, and the first surface, and a second section is a section orthogonal to the first section. A reflection area for an internal reflection of the light on the first surface has a center part that is concave toward the exit pupil on the second section and a peripheral part at both sides of the center part has a convex shape toward the exit pupil.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention.

First Embodiment

Figure 1:
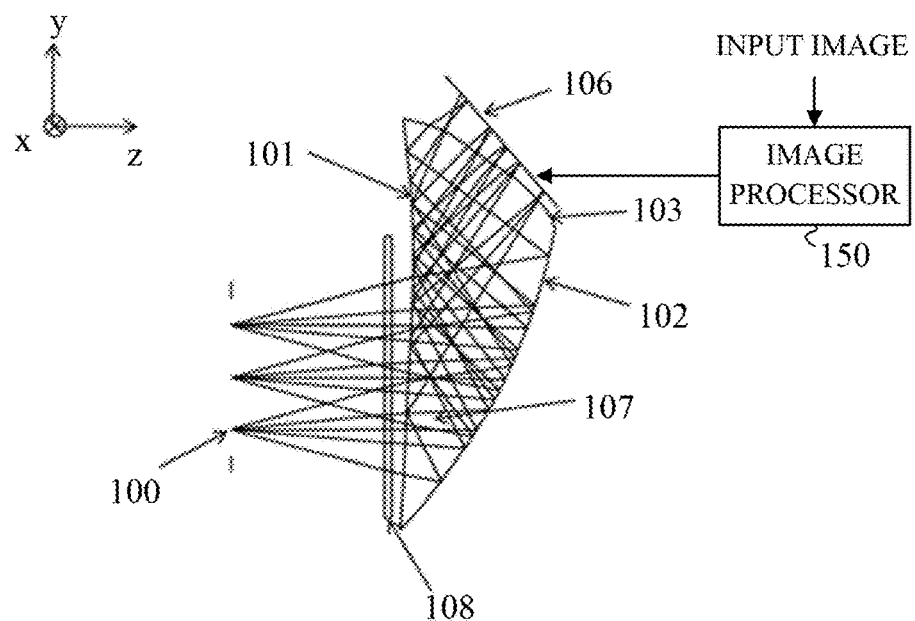
FIG. 1 is a sectional view of an image display apparatus according to a first embodiment of the present invention.
Figure 7:
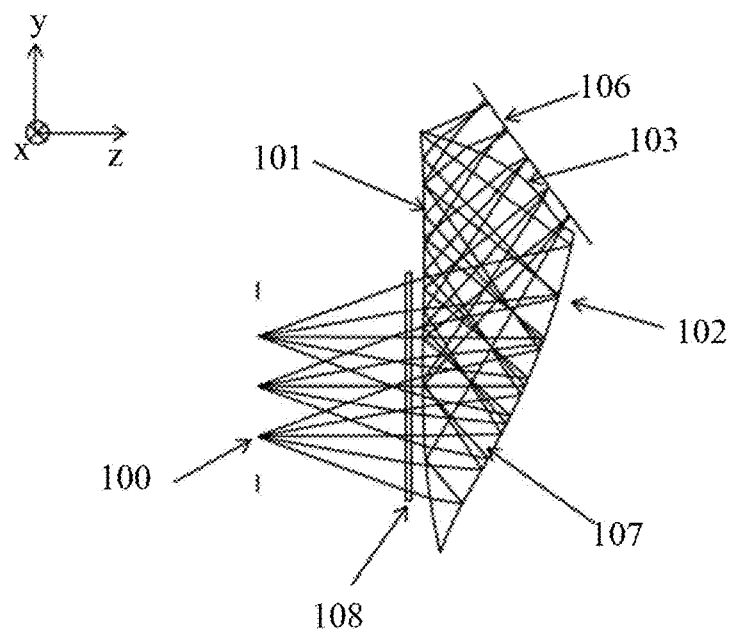
FIG. 7 is a sectional view of an image display apparatus according to a second embodiment of the present invention.
Figure 11:
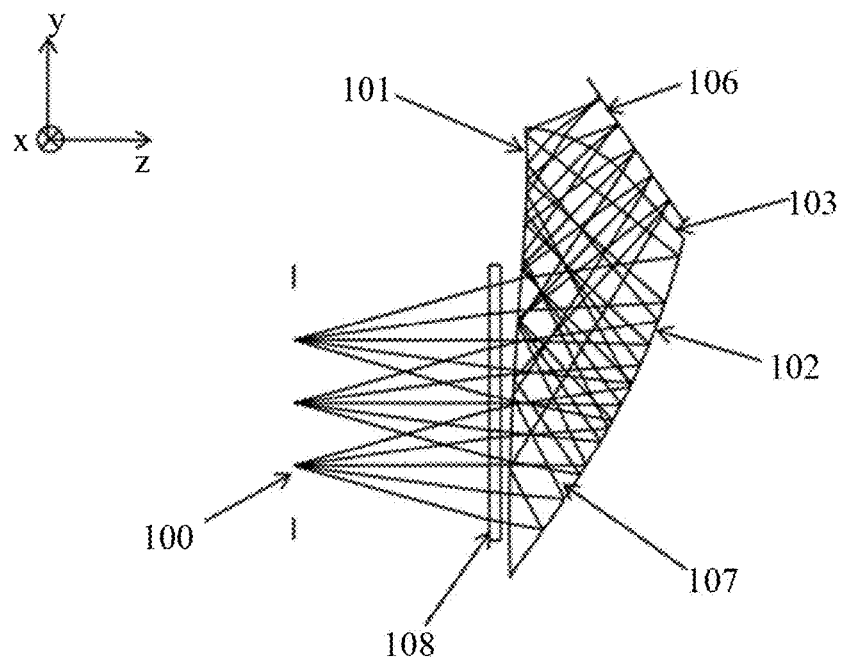
FIG. 11 is a sectional view of an image display apparatus according to a third embodiment of the present invention.

FIG. 1 illustrates a structure and an optical path of an HMD as an image display apparatus according to a first embodiment of the present invention. In FIG. 1, a z-axis direction will be set to a view axis direction for an observer, and a y-axis direction will be set to a direction orthogonal to the z-axis direction on the illustrated paper plane. An x-axis direction will be set to a direction vertical to the illustrated paper plane. In the following description, the x-axis direction will be referred to as a horizontal direction, and the y-axis direction will be referred to as a vertical direction. An angle of view in the x-axis direction visually recognized by the observer will be referred to as a horizontal view angle, and an angle of view in the y-axis direction recognized by the observer will be referred to as a vertical view angle. FIG. 1 illustrates the yz section (first section). This is similarly applied to the following other embodiments (FIGS. 7 and 11).

In FIG. 1, an observation optical system 107 has an exit pupil 100. An observer can observe an image through the observation optical system 107 by placing his eye (pupil) on the exit pupil 100. In the observation optical system 107, reference numeral 101 denotes a first surface that is a reflection and transmission surface. Reference numeral 102 denotes a second surface that is a reflection surface. Reference numeral 103 denotes a third surface that is a transmission surface. The observation optical system 107 includes an integrated prism (optical element) having the first surface 101 to the third surface 103 and the internal space enclosed by these surfaces is filled with an optical medium (glass or plastic) having a refractive index of 1 or higher. The second surface 102 is the reflection surface and has a high-reflectance reflection film (coating) made through a metallic evaporation etc.

A display device (or element) 106 displays an original image. The observer observes the enlarged original image (observation image) through the observation optical system 107. A distance between the first surface 101 and the exit pupil 100 in the observation optical system 107 is known as an eye relief. This embodiment disposes a transparent protective cover 108 between the observation optical system 107 and the exit pupil 100, and the eye relief may be set to a distance between the protective cover 108 and the exit pupil 100.

Light emitted from the original image displayed on the display device 106 transmits the third surface 103, enters the observation optical system 107, is internally totally reflected on the first surface 101, is reflected on the second surface 102, transmits the first surface 101, and reaches the exit pupil 100 through the observation optical system 107. Each of the first surface 101 to the third surface 103 has a free-form shape that decenters on the yz plane and has a symmetrical surface on the yz plane.

The yz section illustrated in FIG. 1 is a section that contains an optical path of the light from the center of the original image (display device 106) to the center of the exit pupil 100 through the third surface 103, the first surface 101, the second surface 102, and the first surface 101. The horizontal direction is a direction parallel to the xz section (second direction) orthogonal to the yz section, and orthogonal to the z-axis direction.

Table 1 shows optical data of numerical example 1 corresponding to the first embodiment. The display device 106 according to this embodiment has a size of 27 mm×17 mm. The observation optical system 107 has a focal length of 19 mm in the horizontal direction and 23 mm in the vertical direction, and displays an image in the z-axis positive direction with a horizontal view angle of 70° and a vertical view angle 40°. The optical data shown in Table 1-a is labelled with a surface number S in a reverse tracing order from a virtual image to the object (display device surface). S1 is a diaphragm (or aperture stop) surface (exit pupil), and S1 is the display device surface. According to this numerical example, optical surfaces S4 to S7 are rotationally asymmetrical surfaces, and a surface symmetrical shape has a sole symmetrical surface on the yz section. S4 corresponds to the first surface (transmission surface), S5 corresponds to the second surface (reflection surface), S6 corresponds to the first surface (internal total reflection surface), and S7 corresponds to the third surface (transmission surface). S2 and S3 are both surfaces of the protective cover.

X, Y, and Z (unit: mm) and A (unit: °) have an origin (0, 0, 0) at the center of S1. A position (x, y, z) of a surface vertex of each surface in the xyz coordinate system is illustrated in the figure. A rotating angle "a" around the x axis of each surface is illustrated where the counterclockwise direction in FIG. 1 is set to the positive direction. The coordinate system with the origin at the surface vertex of each surface will be referred to as a local coordinate system. R is a radius of curvature. A TYP term indicates a type of a surface shape, SPH is a spherical surface, and FFS is a nonrotating and symmetrical surface defined by the following expression where z is a surface sag amount, c is a vertex curvature of 1/R, k is a conic coefficient which is 0 in this numerical example, and r is $\sqrt{(x^2+y^2)}$. The second term on the right side in the expression (1) is defied as follows where $C_j$ is an aspherical coefficient.

$$z = \frac{cr^2}{1+\sqrt{1-(1+k)c^2r^2}} + \Sigma_{j=2}^{66} C_j x^m y^n \qquad (1)$$

$$\sum_{j=2}^{66} C_j x^m y^n = C_2 X + C_3 Y + C_4 X^2 + C_5 XY + C_6 Y^2 + C_7 X^3 + \qquad (2)$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 +$$
$$C_{19} X^2 Y^3 + C_{20} XY^4 + C_{21} Y^5 + C_{22} X^6 + C_{23} X^5 Y + C_{24} X^4 Y^2 +$$
$$C_{25} X^3 Y^3 + C_{26} X^2 Y^4 + C_{27} XY^5 + C_{28} Y^6 + C_{29} X^7 + C_{30} X^6 Y +$$
$$C_{31} X^5 Y^2 + C_{32} X^4 Y^3 + C_{33} X^3 Y^4 + C_{34} X^2 Y^5 + C_{35} Y^6 +$$
$$C_{36} Y^7 + C_{37} X^8 + C_{38} X^7 Y + C_{39} X^6 Y^2 + C_{40} X^5 Y^3 +$$
$$C_{41} X^4 Y^4 + C_{42} X^3 Y^5 + C_{43} X^2 Y^6 + C_{44} XY^7 + C_{45} Y^8 + \cdots$$

In the TYP column, a numerical value appended to FFS means that the surface shape corresponds to the asymmetrical coefficient shown in Table 1-b. A value of the coefficient $C_j$ term which is not shown in the table is 0. In Table 1-a, Nd and vd are a refractive index and an Abbe number of the medium for the d-line wavelength of the subsequent surfaces. When the medium is air, only the refractive Nd is shown as 1.000 and the Abbe number vd is blanked.

TABLE 1-a

| S | TYP | R | X | Y | Z | A | Nd | vd |
|---|---|---|---|---|---|---|---|---|
| 1 | SPH | ∞ | 0 | 0 | 0 | 0 | 1.00000 | |
| 2 | SPH | ∞ | 0 | 0 | 17.800 | 0 | 1.49175 | 57.5 |
| 3 | SPH | ∞ | 0 | 0 | 18.600 | 0 | 1.00000 | |
| 4 | FFS1 | ∞ | 0 | 13.928 | 21.066 | −0.014 | 1.57090 | 33.8 |
| 5 | FFS2 | ∞ | 0 | 0.000 | 31.771 | −26.227 | 1.57090 | 33.8 |
| 6 | FFS1 | ∞ | 0 | 13.928 | 21.066 | −0.014 | 1.57090 | 33.8 |
| 7 | FFS3 | ∞ | 0 | 24.907 | 29.513 | 56.208 | 1.00000 | |
| I | SPH | ∞ | 0 | 27.048 | 31.276 | 40.779 | | |

TABLE 1-b

| COEFFICIENT | FFS1 | FFS2 | FFS3 |
|---|---|---|---|
| C4 | −8.5399E−03 | −1.0253E−02 | −1.1191E−02 |
| C6 | −4.4645E−03 | −7.4653E−03 | 1.2600E−02 |
| C8 | −1.0606E−04 | 4.1438E−07 | 1.9261E−04 |
| C10 | −8.4280E−05 | −1.0305E−05 | 1.1241E−03 |
| C11 | 1.3116E−05 | 9.0797E−07 | −1.3298E−05 |
| C13 | 5.1015E−06 | −9.5992E−07 | 2.3805E−05 |
| C15 | 3.1158E−06 | −2.4314E−07 | −5.2884E−04 |
| C17 | 2.0853E−07 | −5.3680E−08 | −2.4475E−07 |
| C19 | 2.0046E−07 | −7.9235E−08 | −4.6068E−06 |
| C21 | 1.6154E−08 | −8.9525E−08 | −2.4072E−05 |
| C22 | −9.4824E−09 | 8.1332E−10 | 2.8363E−08 |
| C24 | 5.4931E−09 | 1.9837E−09 | 5.2771E−09 |
| C26 | −1.0542E−08 | 4.2124E−09 | 9.3284E−07 |
| C28 | 9.7826E−10 | 7.7687E−09 | 3.8014E−06 |
| C30 | −1.9002E−10 | 1.0456E−11 | −4.0925E−10 |
| C32 | 6.0889E−10 | 1.8502E−10 | 1.3650E−08 |
| C34 | −9.1674E−10 | 5.8294E−11 | −1.7109E−08 |
| C36 | 3.0944E−10 | 1.9180E−10 | 1.4015E−07 |
| C37 | 1.6848E−12 | 1.2327E−12 | −1.9408E−11 |
| C39 | 3.6231E−12 | −6.5538E−13 | −4.2395E−11 |
| C41 | 9.8306E−12 | −1.2588E−12 | −1.9258E−10 |
| C43 | −1.5835E−11 | −6.8535E−12 | −4.4788E−09 |
| C45 | 6.5968E−12 | −1.5007E−11 | −1.0870E−08 |

The first surface 101 has an optical effective area with a range of ±23.7 mm in the local x coordinate and 15.4 mm to −27.1 mm in the local y coordinate.

Referring now to FIGS. 2 to 5, a description will be Liven of a shape of the first surface 101. The first surface 101 is a reflection and transmission surface that internally totally reflects the light incident with an incident angle equal to or higher than a critical angle, and transmits the light incident with an incident angle smaller than the critical angle. The critical angle is 39.5° based on the refractive index of 1.5709 to the d-line of the optical medium in the prism in the observation optical system 107, and the incident angle of about 40° or higher is necessary on the first surface 101 for the internal total reflection of the light from the third surface 103 without fail. The minimum incident angle is set based on the refractive index fluctuations etc. caused by the wavelength of light from the display device 106 and the temperature, but the following description uses the values to the d-line near the room temperature.

A shorter paraxial focal length or a high enlargement ratio is necessary for a wide angle of view of the observation optical system 107, and it is thus necessary to make stronger the power of the second surface 102. However, as the power of the second surface 102 becomes stronger, the incident angle on the first surface 101 is likely to be smaller in the reflection. In particular, it is difficult to increase the incident angle at an angle of view near x=0 that provides the horizontal view angle with 0°, and thus the surface shape at x=0 or near the view angle center (referred to as a "center part" hereinafter) in the horizontal direction on the first surface 101 is likely to be concave toward the exit pupil 100.

Figure 2:
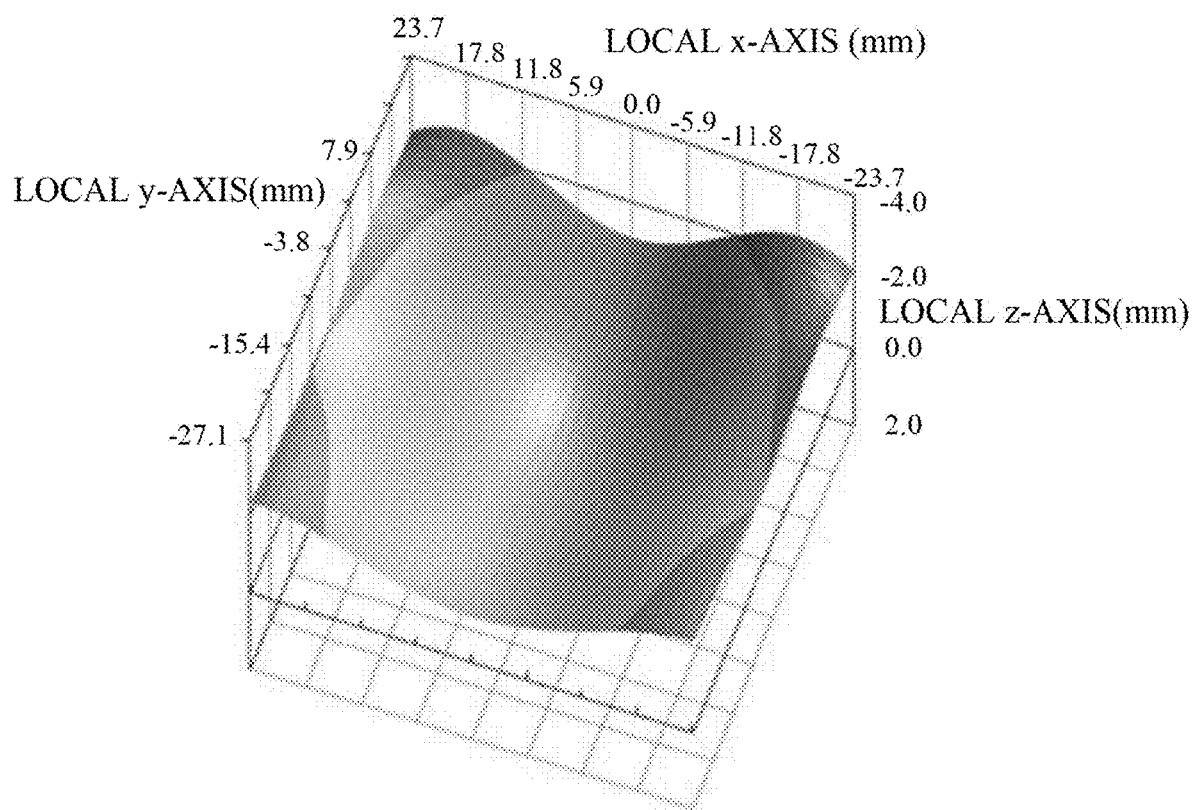
FIG. 2 illustrates a shape of a first surface according to the first embodiment.
Figure 3:
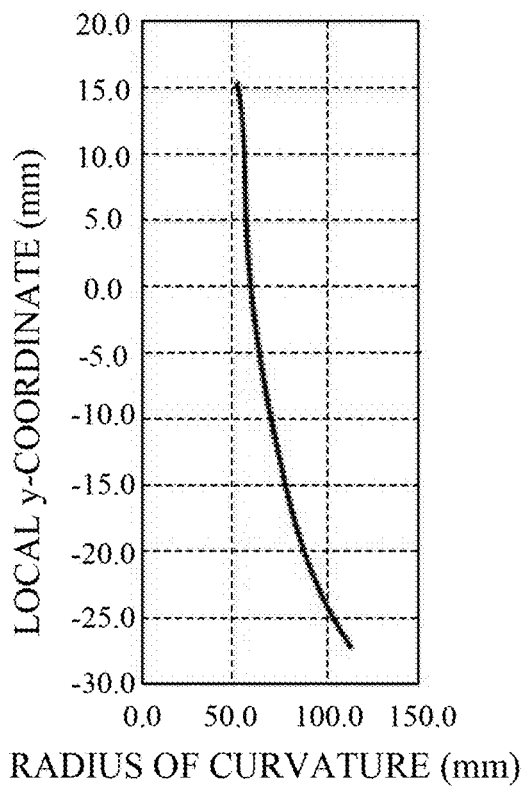
FIG. 3 illustrates a radius of curvature at x=0 on the first surface according to the first embodiment.

FIG. 2 illustrates a three-dimensional surface shape of the first surface 101, where the side on which the value in the local z-axis direction (view axis direction) is minus is the exit pupil side. FIG. 3 is a graph made by plotting in the local y-axis direction (vertical direction) a radius of curvature in the local x-axis direction (horizontal direction) at x=0 in FIG. 2. The radius of curvature is minimum at y=15.4 mm or at the position closest to the +y side in the optical effective area. All centers of the radii of curvature in FIG. 3 are located on the exit pupil side, and the surface shape is concave toward the exit pupil at any y coordinate positions at the center part near x=0.

Figure 4:
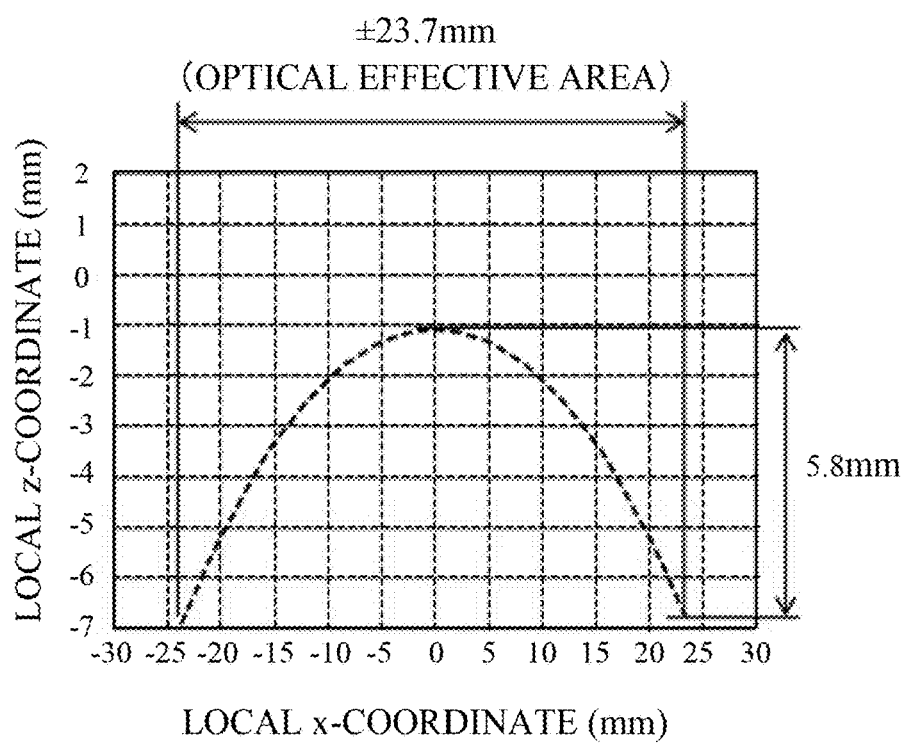
FIG. 4 illustrates a circularly approximated a shape near a position of x=0 and y=15.4 on the first surface according to the first embodiment.

When the concave shape of the center part in the horizontal direction at y=15.4 mm on the first surface 101 is extended to the end of the optical effective area in the same direction, the peripheral part on both sides of the center part of the first surface 101 in the horizontal direction protrudes to the exit pupil side by 5.8 mm from the surface vertex at x=0 as illustrated by a broken line in FIG. 4. The image can be comfortably observed as the eye relief becomes longer that is a distance between the exit pupil 100 (eye of the observer) and the protective cover 108 on or near the first surface 101 as the final optical surface in the observation optical system 107. For example, an eye relief of 10 mm or longer is considered necessary for the protective cover 108 to avoid interference with the eyebrows in attaching the HMD to the head, and an eye relief of 15 mm or longer is necessary for an observer wearing glasses to mount the HMD. However, it is difficult for the peripheral part that protrudes to the exit pupil side as illustrated in FIG. 4 to maintain the eye relief in the horizontal direction.

Figure 5:
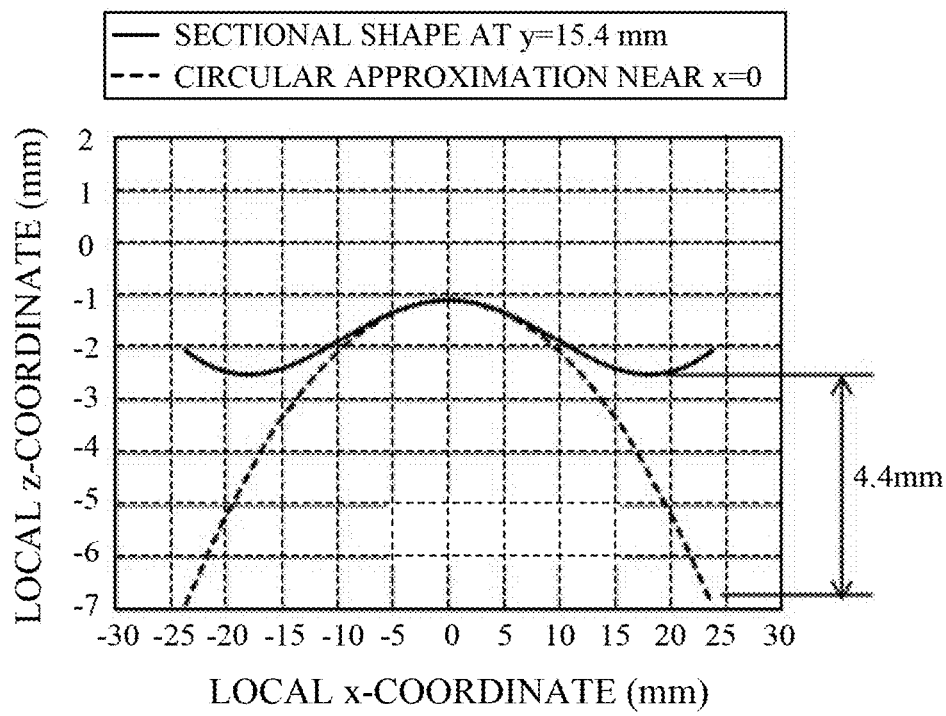
FIG. 5 illustrates an actual optical surface shape according to the first embodiment.

FIG. 5 illustrates a sectional shape (solid line) in the horizontal direction of the first surface 101 at y=15.4 mm according to this embodiment. The first surface 101 has a free-form surface (rotational-asymmetrical surface) in which the center part in the horizontal direction is concave toward the exit pupil and the peripheral part is convex toward the exit pupil. In other words, the sectional shape of the peripheral part has a convex inflection point. The peripheral part is a region through which the light for forming the angle of view in the horizontal direction transmits, receives a large incident angle due to the horizontal view angle, and can totally reflect the incident light although it has a convex surface shape toward the exit pupil.

This numerical example utilizes such characteristics and totally reflects the incident light through the concave surface shape of the center part toward the exit pupil in the horizontal direction. On the other hand, the peripheral part receives a sufficient incident angle for the total reflection, and has a convex surface shape toward the observer so as to reduce or remove the protrusion to the exit pupil side. As illustrated in FIG. 5, this numerical example has an effect of reducing the protrusion by about 4.4 mm at y=15.4 mm in comparison with a case where the concave radius of curvature at the center part is extended to the end of the optical effective area. In other words, this embodiment has an effect of making longer the eye relief by about 4.4 mm.

As described above, according to this embodiment, the total reflection area on the first surface 101 for internally totally reflecting the light from the third surface 103 has a concave center part in the horizontal direction (on the second section) toward the exit pupil, and the peripheral part on both sides of the center part has a convex shape toward the exit pupil. This configuration can realize the HMD that secures a sufficient eye relief with a wide angle of view.

It is unnecessary that the horizontal peripheral part on the first surface 101 has a convex surface shape toward the exit pupil at all positions in the vertical direction and it is sufficient that the horizontal peripheral part has a convex surface shape at least near the vertical position with the smallest concave radius of curvature. In other words, the first surface 101 may contain the peripheral part that is not concave toward the exit pupil.

Figure 6:
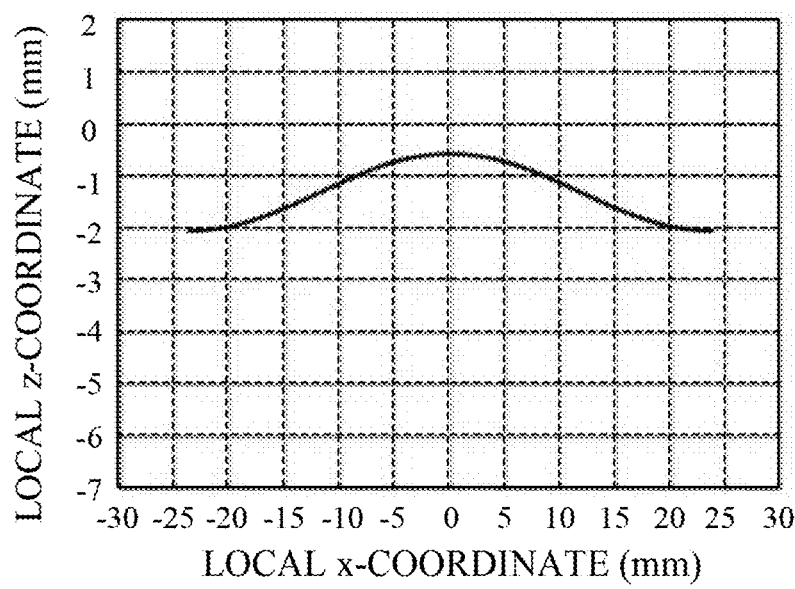
FIG. 6 illustrates another actual optical surface shape according to the first embodiment.

FIG. 6 illustrates a sectional shape of the first surface 101 at y=−14.4 mm. The concave radius of curvature at this position is 1.5 times as long as that at y=15.4 mm. It is unnecessary that the horizontal peripheral part has a convex surface shape toward the exit pupil at this position, and the surface shape may be determined based on other optical performances, such as a resolving power and a distortion.

A narrow horizontal view angle results in a narrow optical effective area and a small protrusion amount of the first surface 101 to the exit pupil side. A high freedom degree of the optical design often provides the first surface 101 with a reflection angle enough for the total reflection angle, and it is thus unnecessary to reduce the radius of curvature near x=0. Hence, the surface shape on the first surface 101 with the concave center part and the convex peripheral part in the horizontal direction is particularly effective when the observation optical system 107 has a wide horizontal view angle, such as equal to or wider than 35°.

Moreover, the surface shape of the first surface 101 with the concave center part and the convex peripheral part in the horizontal direction is necessary to secure the eye relief for comfortable observations of the image, and is particularly effective to the eye relief equal to or longer than 10 mm or 15 mm.

According to this embodiment, the image processor 150 that includes an image processing dedicated computer etc. generates an original image to be displayed on the display device 106. In this case, the image processor 150 provides image processing for generating the original image that is intentionally electronically distorted so as to cancel out the aberration(s), such as the distortion, in the observation optical system 107. More specifically, the image processor 150 includes a conversion table for the geometric transformation so as to cancel the distortion in the observation optical system 107, and generates the distorted original image that is made by modifying the rectangular input image using the conversion table. The distorted original image can be generated for each color, such as RGB. This configuration can reduce a large distortion in the observation image caused by the first surface 101 that has a concave surface part (center part) and a convex surface part (peripheral part) and realizes the good image observation.

The image processor 150 may include a personal computer different from the HMD. In this case, an image processing program (or a storage medium storing the image processing program) that enables the personal computer to execute the image processing and the HMD constitute the image processing apparatus.

While this embodiment discusses the use of the observation optical system having three optical surfaces, the observation optical system may have four or more optical surfaces.

Second Embodiment

FIG. 7 illustrates a structure and an optical path of an HMD according to a second embodiment. Table 2 shows optical data of numerical example 2 corresponding to this embodiment. The display device 106 according to this numerical example has a size of 27 mm×17 mm. The observation optical system 107 has a focal length of 21 mm in the horizontal direction and 23 mm in the vertical direction, and displays an image in the z-axis positive direction with a horizontal view angle of 65° and a vertical view angle 40°. The meaning of the optical data is similar to that in the first embodiment.

TABLE 2-a

| S | TYP | R | X | Y | Z | A | Nd | ν d |
|---|-----|---|---|---|---|---|----|-----|
| 1 | SPH | ∞ | 0 | 0 | 0 | 0 | 1.00000 | |
| 2 | SPH | ∞ | 0 | 0 | 17.800 | 0 | 1.49175 | 57.5 |
| 3 | SPH | ∞ | 0 | 0 | 18.600 | 0 | 1.00000 | |
| 4 | FFS1 | ∞ | 0 | 13.787 | 20.049 | −0.563 | 1.57090 | 33.8 |
| 5 | FFS2 | ∞ | 0 | 0.000 | 32.218 | −24.283 | 1.57090 | 33.8 |
| 6 | FFS1 | ∞ | 0 | 13.787 | 20.049 | −0.563 | 1.57090 | 33.8 |
| 7 | FFS3 | ∞ | 0 | 25.713 | 31.000 | 55.073 | 1.00000 | |
| I | SPH | ∞ | 0 | 27.267 | 32.549 | 36.152 | | |

TABLE 2-b

| COEFFICIENT | FFS1 | FFS2 | FFS3 |
|---|---|---|---|
| C4 | −5.4881E−03 | −8.7534E−03 | −2.1563E−02 |
| C6 | −1.0497E−03 | −5.7839E−03 | −2.9990E−02 |
| C8 | −9.8858E−05 | 4.9870E−07 | 4.6656E−04 |
| C10 | −5.6420E−05 | −2.6228E−05 | 1.3177E−03 |
| C11 | 7.9957E−06 | 9.1103E−07 | 3.1762E−05 |
| C13 | 2.7151E−06 | 2.0713E−07 | 2.4463E−04 |
| C15 | 1.9566E−06 | 2.6395E−06 | 2.1353E−05 |
| C17 | 1.8687E−07 | −4.1966E−08 | −2.6021E−06 |
| C19 | −4.4491E−08 | −5.1636E−08 | −2.5977E−05 |
| C21 | 5.5238E−08 | −1.2385E−08 | −7.1348E−06 |
| C22 | −3.4416E−09 | 8.8266E−10 | −2.3717E−08 |
| C24 | 2.6045E−09 | −7.8911E−10 | −1.3012E−07 |
| C26 | −1.0557E−08 | −1.3171E−09 | −2.7344E−07 |
| C28 | −2.0122E−09 | −3.6166E−09 | 6.7046E−07 |
| C30 | −7.7051E−11 | 4.7581E−11 | 2.4339E−09 |
| C32 | 2.3652E−10 | 1.7189E−10 | 3.8778E−08 |
| C34 | 1.1368E−10 | 3.8878E−10 | 1.2659E−07 |
| C36 | −2.2366E−10 | −2.4583E−10 | −5.9658E−08 |
| C37 | −6.0349E−13 | −6.5594E−13 | 2.4246E−12 |
| C39 | 2.6177E−12 | 1.7463E−12 | −1.2489E−10 |
| C41 | 3.6902E−12 | −6.1359E−12 | −1.4559E−09 |
| C43 | 6.6215E−12 | −1.0179E−11 | −4.2454E−09 |
| C45 | −4.1711E−12 | 1.1561E−11 | 2.3567E−09 |

The first surface 101 has an optical effective area with a range of ±27.8 mm in the local x coordinate and 16.4 mm to −27.1 mm in the local y coordinate.

Figure 8:
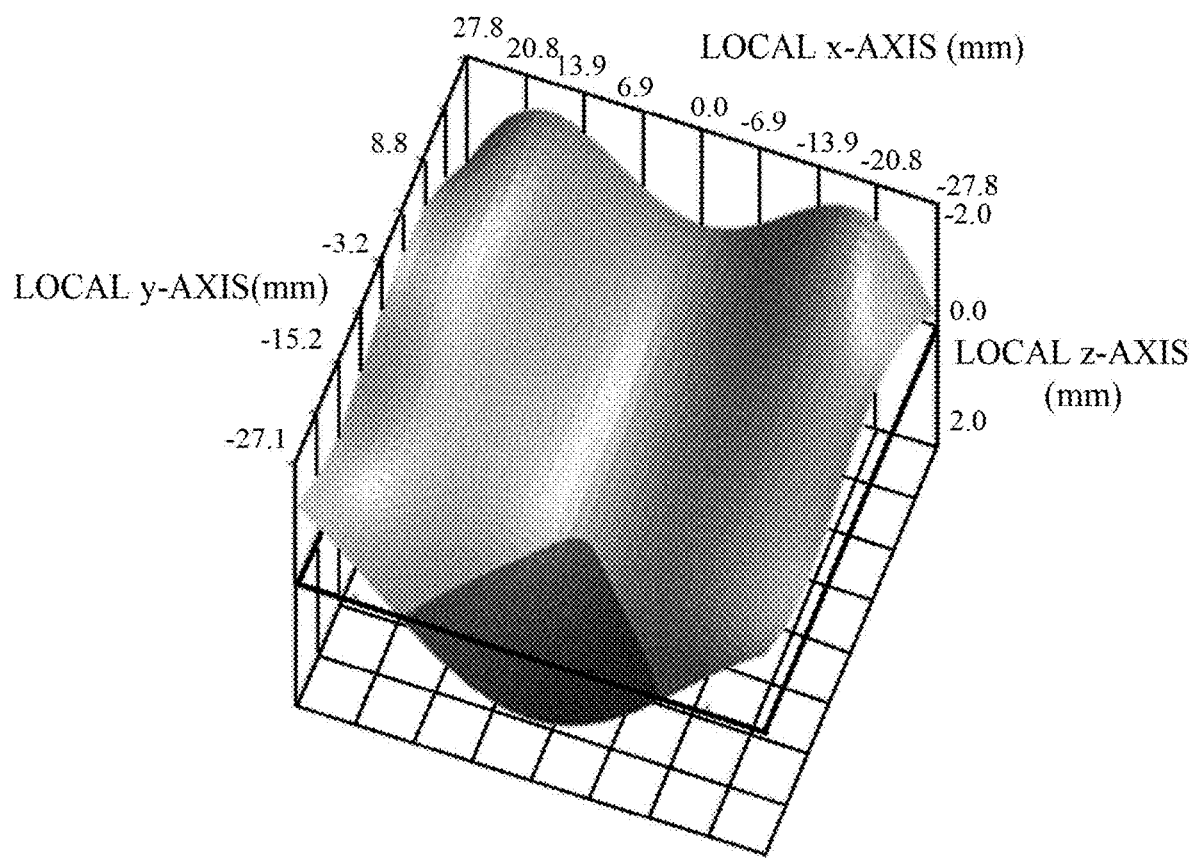
FIG. 8 illustrates a shape of a first surface according to the second embodiment.
Figure 9:
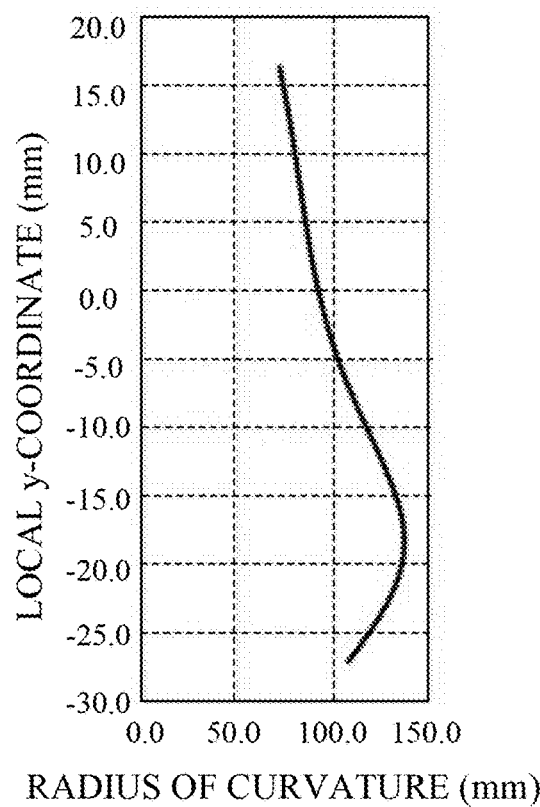
FIG. 9 illustrates a radius of curvature at x=0 on the first surface according to the second embodiment.

FIG. 8 illustrates a three-dimensional surface shape of the first surface 101, where the side on which the value in the local z-axis direction (view axis direction) is minus is the exit pupil side. FIG. 9 is a graph made by plotting in the local y-axis direction (vertical direction) a radius of curvature in the local x-axis direction (horizontal direction) at x=0 in FIG. 8. The radius of curvature is minimum at y=16.4 mm or at the position closest to the +y side in the optical effective area. All centers of the radii of curvature in FIG. 9 are located on the exit pupil side, and the surface shape is concave toward the exit pupil at any y coordinate positions at the center part near x=0.

Figure 10:
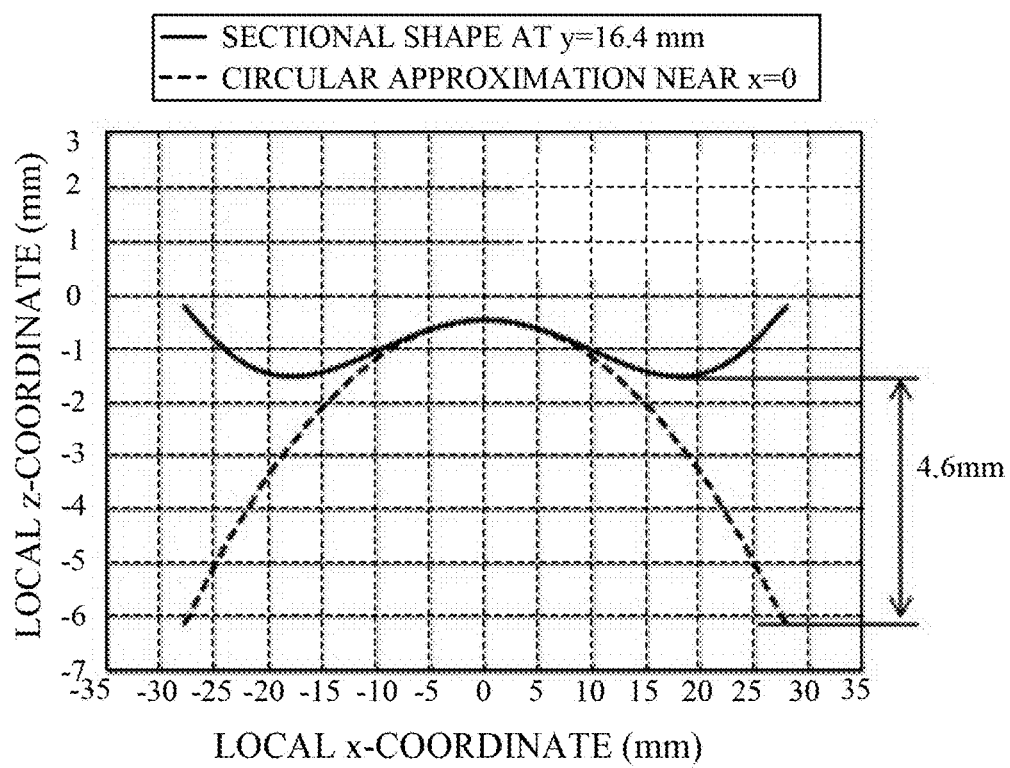
FIG. 10 illustrates an actual optical surface shape according to the second embodiment.

FIG. 10 illustrates a sectional shape (solid line) in the horizontal direction of the first surface 101 at y=16.4 mm according to this numerical example, and a sectional shape (broken line) when the concave shape of the center part in the horizontal direction is extended to the end of the optical effective area in the same direction. Even in this numerical example, the first surface 101 has a free-form surface in which the center part in the horizontal direction is concave toward the exit pupil and the peripheral part is convex toward the exit pupil. Thus, the eye relief can be made longer by 4.6 mm than with the sectional shape illustrated by the broken line, since the peripheral part of the first surface 101 in the horizontal direction has a convex surface shape toward the exit pupil.

Third Embodiment

FIG. 11 illustrates a structure and an optical path of an HMD according to a third embodiment. Table 3 shows optical data of numerical example 3 corresponding to this embodiment. The display device 106 according to this numerical example has a size of 18 mm×12 mm. The observation optical system 107 has a focal length of 21 mm in each of the horizontal and vertical directions, and displays an image in the z-axis positive direction with a horizontal view angle of 48° and a vertical view angle 31°. The meaning of the optical data is similar to that in the first embodiment.

TABLE 3-a

| S | TYP | R | X | Y | Z | A | Nd | ν d |
|---|-----|---|---|---|---|---|----|-----|
| 1 | SPH | ∞ | 0 | 0 | 0 | 0 | 1.00000 | |
| 2 | SPH | ∞ | 0 | 0 | 18.000 | 0 | 1.49175 | 57.5 |
| 3 | SPH | ∞ | 0 | 0 | 19.000 | 0 | 1.00000 | |
| 4 | FFS1 | ∞ | 0 | 21.190 | 21.502 | −0.208 | 1.57090 | 33.8 |
| 5 | FFS2 | ∞ | 0 | −10.803 | 23.565 | −35.223 | 1.57090 | 33.8 |
| 6 | FFS1 | ∞ | 0 | 21.190 | 21.502 | −0.208 | 1.57090 | 33.8 |
| 7 | FFS3 | ∞ | 0 | 8.077 | 41.126 | 11.735 | 1.00000 | |
| I | SPH | ∞ | 0 | 8.341 | 41.543 | 34.045 | | |

TABLE 3-b

| COEFFICIENT | FFS1 | FFS2 | FFS3 |
|---|---|---|---|
| C4 | −9.5592E−03 | −8.9283E−03 | −3.7636E−03 |
| C6 | −9.2281E−03 | −3.6982E−03 | −9.7750E−02 |
| C8 | −2.4070E−04 | −1.1603E−04 | −2.3750E−03 |
| C10 | −4.6297E−04 | −5.3262E−05 | 5.3555E−03 |
| C11 | −8.1758E−06 | −2.6057E−06 | 2.3109E−04 |
| C13 | 8.0944E−06 | −1.1692E−06 | −1.6188E−04 |
| C15 | −8.4128E−06 | −2.1581E−06 | −3.1854E−05 |
| C17 | 0.0000E+00 | 0.0000E+00 | 0.0000E+00 |
| C19 | 0.0000E+00 | 0.0000E+00 | 0.0000E+00 |
| C21 | 0.0000E+00 | 0.0000E+00 | 0.0000E+00 |
| C22 | 7.2519E−08 | 2.7870E−09 | −1.1909E−06 |

TABLE 3-b-continued

| COEFFICIENT | FFS1 | FFS2 | FFS3 |
|---|---|---|---|
| C24 | −2.1319E−08 | 2.5215E−08 | 5.2181E−07 |
| C26 | −2.1031E−08 | 1.3852E−08 | 6.6000E−07 |
| C28 | 1.7197E−09 | 1.7146E−09 | −3.3305E−07 |
| C30 | 2.4057E−09 | −8.2850E−10 | −9.5279E−08 |
| C32 | −1.3937E−09 | −1.6495E−09 | 4.9899E−08 |
| C34 | −4.8110E−10 | −5.5743E−10 | −2.4841E−08 |
| C36 | 3.9882E−12 | 5.0962E−11 | 1.0949E−08 |
| C37 | 7.2296E−13 | 2.1427E−11 | 4.2826E−09 |
| C39 | 2.1226E−11 | 2.0594E−11 | 3.1596E−09 |
| C41 | −1.8338E−11 | 2.8459E−11 | −3.3137E−09 |
| C43 | −1.7636E−12 | 4.9531E−12 | 6.8466E−10 |
| C45 | −1.5181E−13 | −2.0497E−12 | −1.9793E−10 |

The first surface 101 has an optical effective area with a range of ±18.4 mm in the local x coordinate and 3.9 mm to −32.8 mm in the local y coordinate.

Figure 12:
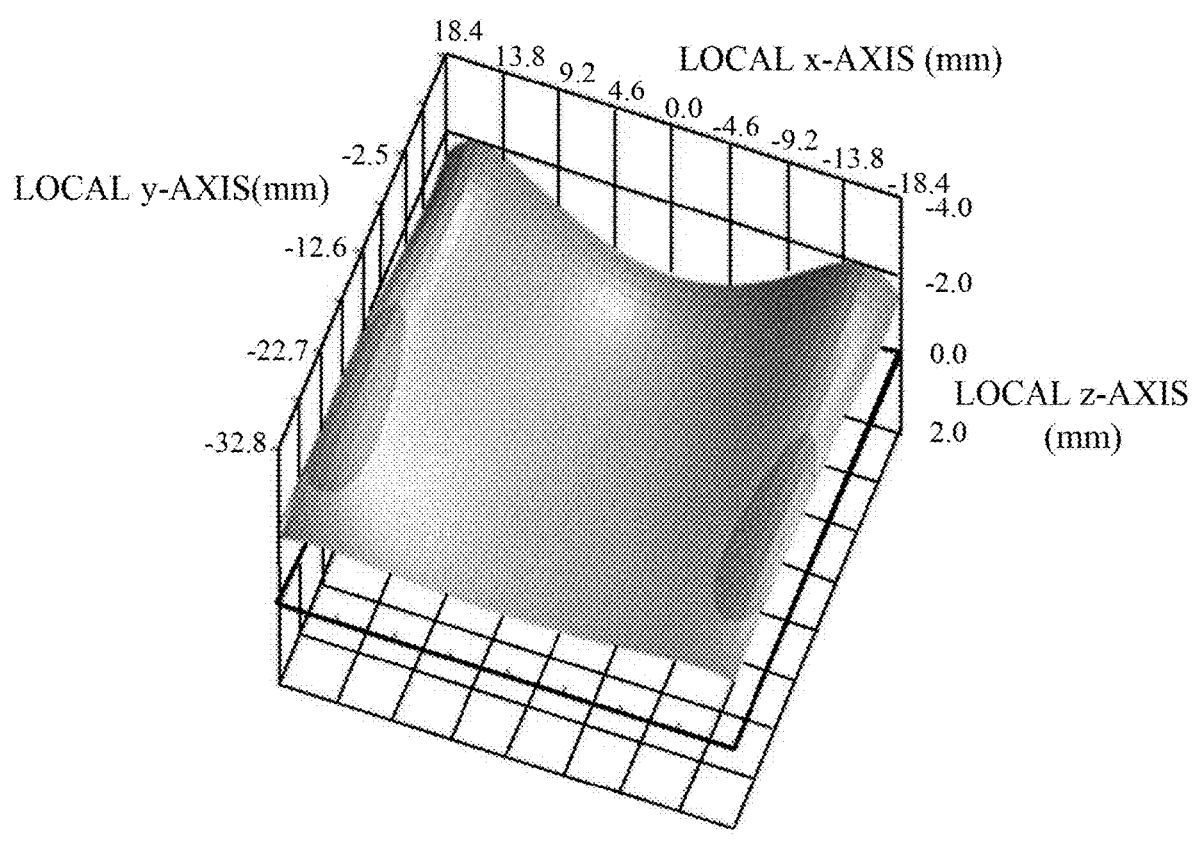
FIG. 12 illustrates a shape of a first surface according to the third embodiment.
Figure 13:
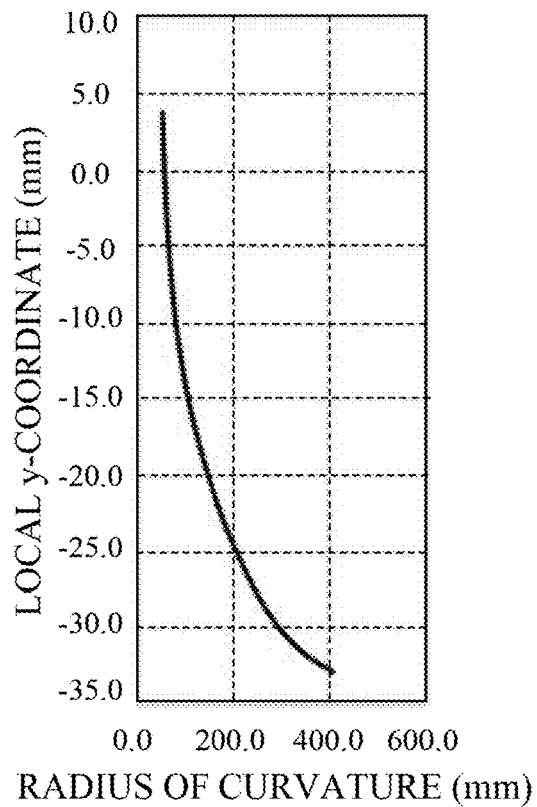
FIG. 13 illustrates a radius of curvature at x=0 on the first surface according to the second embodiment.

FIG. 12 illustrates a three-dimensional surface shape of the first surface 101, where the side on which the value in the local z-axis direction (view axis direction) is minus is the exit pupil side. FIG. 13 is a graph made by plotting in the local y-axis direction (vertical direction) a radius of curvature in the local x-axis direction (horizontal direction) at x=0 in FIG. 2. The radius of curvature is minimum at y=3.9 mm or at the position closest to the +y side in the optical effective area. All centers of the radii of curvature in FIG. 13 are located on the exit pupil side, and the surface shape is concave toward the exit pupil at any y coordinate positions at the center part near x=0.

Figure 14:
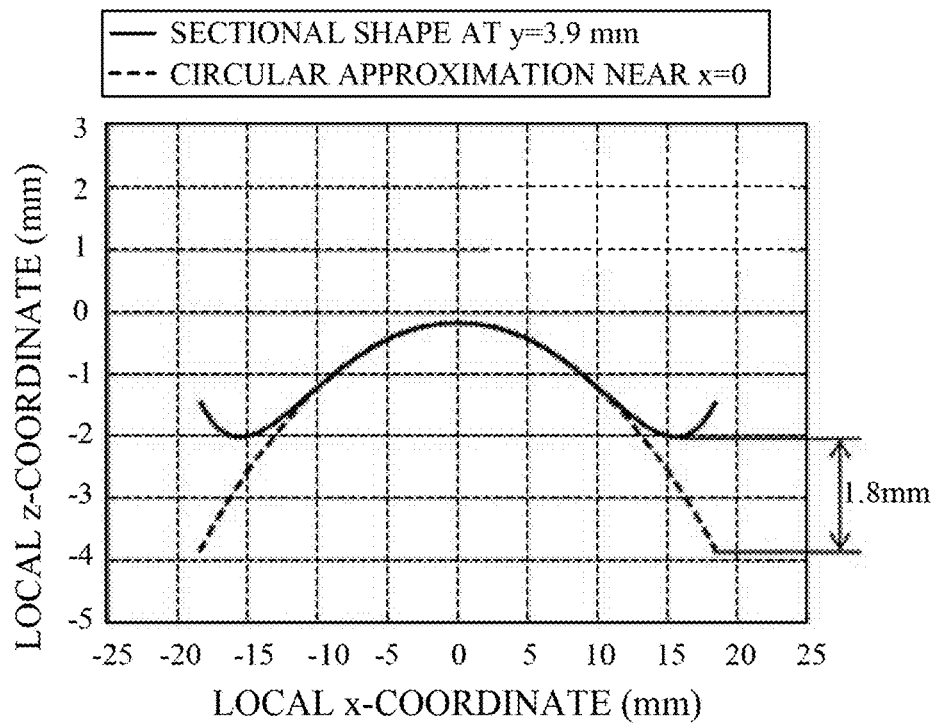
FIG. 14 illustrates an actual optical surface shape according to the third embodiment.

FIG. 14 illustrates a sectional shape (solid line) in the horizontal direction of the first surface 101 at y=3.9 mm according to this numerical example, and a sectional shape (broken line) when the concave shape of the center part in the horizontal direction is extended to the end of the optical effective area in the horizontal direction. Even in this numerical example, the first surface 101 has a free-form surface in which the center part in the horizontal direction is concave toward the exit pupil and the peripheral part is convex toward the exit pupil. Thus, the eye relief can be made longer by 1.8 mm than with the sectional shape illustrated by the broken line, since the peripheral part of the first surface 101 in the horizontal direction has a convex surface shape toward the exit pupil.

According to each embodiment, the image display apparatus using the decentering optical system that contains the first surface as the reflection and transmission surface can secure a sufficient eye relief with a wide angle of view.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-166284, filed on Aug. 31, 2017, which is hereby incorporated by reference herein in its entirety.

What is claimed is:

1. An image display apparatus comprising:
a display device; and
an observation optical system that includes a prism having at least a first surface, a second surface, and a third surface as optical surfaces, an internal space in the prism being filled with an optical medium,
wherein the observation optical system is configured to enable light from an original image displayed on the display device to transmit the third surface, to reflect the light on the first surface, to reflect the light on the second surface, to transmit the light through the first surface, and to lead the light to an exit pupil,
wherein the observation optical system has a first section that is a section containing an optical path of light from a center of the original image to a center of the exit pupil through the third surface, the first surface, the second surface, and the first surface, and a second section that is a section orthogonal to the first section, and
wherein a reflection area for an internal reflection of the light on the first surface has a center part that is concave toward the exit pupil on the second section and a peripheral part at both sides of the center part has a convex shape toward the exit pupil on the second section.

2. The image display apparatus according to claim 1, wherein the peripheral part has a convex shape on the second section corresponding to a position on the first section, in which the center part in the reflection area has a minimum concave radius of curvature.

3. The image display apparatus according to claim 2, wherein the reflection area has a symmetrical shape with respect to the first section, and the radius of curvature is minimum at a position on the second section which the first section passes.

4. The image display apparatus according to claim 2, wherein the second section in the observation optical system has an angle of 35° or larger.

5. The image display apparatus according to claim 1, wherein the peripheral part has a convex shape on one of a plurality of second sections vertical to the first section, in which the center part in the reflection area has a minimum concave radius of curvature.

6. The image display apparatus according to claim 1, wherein the eye relief has a length of 10 mm or longer.

7. The image display apparatus according to claim 1, wherein the reflection area has a peripheral part that is not concave toward the exit pupil.

8. The image display apparatus according to claim 1, further comprising an image processor configured to perform image processing that provide a distortion to the original image so as to reduce a distortion in an observed image caused by a surface shape on the first surface or an image processing program that enables a computer to execute the image processing.

* * * * *